Figure 1:
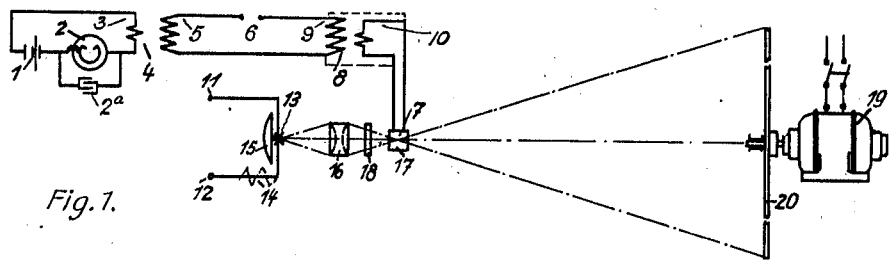

Dec. 30, 1930.  A. ABEL  1,787,334

DEVICE FOR THE PRODUCTION OF APPARENTLY MOVING DISPLAY MATTER

Original Filed Oct. 26, 1929

Inventor.
August Abel
By Dowell and Dowell
Attorneys.

Patented Dec. 30, 1930

1,787,334

UNITED STATES PATENT OFFICE

AUGUST ABEL, OF LEIPZIG, GERMANY

DEVICE FOR THE PRODUCTION OF APPARENTLY-MOVING DISPLAY MATTER

Original application filed October 26, 1929, Serial No. 402,673, and in Germany December 14, 1928. Divided and this application filed August 14, 1930. Serial No. 475,154.

This invention relates to optical devices and is the subject of division from my pending application Serial No. 402,673, filed Oct. 26, 1929, for light advertising devices. It has reference particularly to a method and means for producing apparently moving displays of objects and representations with continuous light, for advertising purposes, the same being closely related to the subject-matter of the aforesaid application.

In devices for the production of apparently moving advertising representations, which are based upon the "persistance of vision" of the human eye and in which a carrier bearing the representations is adapted to move in a luminous field produced by short light flashes, inertialess sources of light, or more especially gas discharging tubes such as neon or Moore light tubes, have heretofore almost exclusively been used. However, these gas discharge tubes require complicated auxiliary devices for the provision of a suitable electric current, or for the transformation of an unsuitable current into one suited for the purpose and having the required tension and frequency, as well as the most appropriate characteristic. Especially in the case of large sized advertising devices, such auxiliary apparatus is very costly, usually necessitates a certain amount of watching and, to some extent, is dangerous on account of the high tension required. Another disadvantage is the intensity of light produced by such luminous tubes being relatively low, especially if the light is to be concentrated upon a small space.

The main object of this invention is to avoid all these difficulties and it mainly consists in the provision of means causing the illumination of the carrier and the representations thereon to be occasioned by a luminous field produced by ordinary inert sources of light, such as strong candle-power electric-arc or incandescent lamps, in much the same manner as by luminous tubes fed by suitable electric current impulses. The invention therefore provides for a luminous field by ordinary sources of light, consisting of individual flashes of light of very short duration and which follow each other in predetermined equally spaced intervals. The intensities of the sources of light employed in this way may be as great as desired and thus enable the construction of considerably larger devices than heretofore, affording considerably greater and more powerful effects.

According to the invention, strong inert sources of light such as large incandescent lamps are used to give forth light continuously and the rays emanating therefrom are collected by suitable means, such as reflecting mirrors or condensers, and transformed into evenly timed light flashes of short duration by suitable electric or mechanical means acting approximately in the focal point of the rays. The flashes thus produced from the ordinary sources of light are then cast or projected either directly or by means of special lenses or mirrors onto the representations on the moving carrier.

The means employed to transform the rays from ordinary, inert and constantly shining sources of light into light flashes of short duration and suitable frequency, may be of different kinds. For example, they may consist of a light-electric relay, such as a Kerr-cell, a rapidly moving mirror, or a shutter provided with a hole therein.

The accompanying drawings illustrate several modifications of the invention by way of example.

In said drawings:

Fig. 1 diagrammatically illustrates the transformation of the collected rays from a continuously shining source of light into flashes of short duration, and their control for obtaining evenly spaced intervals by means of a Kerr-call serving as a light-electric relay.

Figure 2:
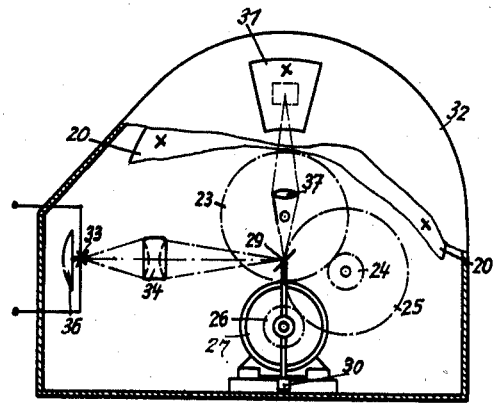
Figure 3:
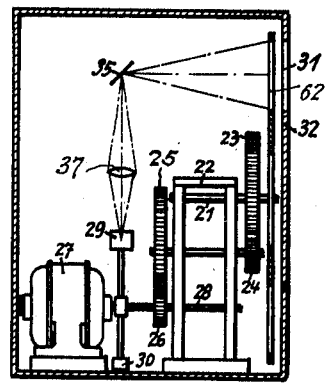

Figs. 2 and 3 illustrate the employment of a mechanical control by means of a rapidly rotating mirror for the same purpose; Fig. 2 being a front elevation of the device with its casing wall and the carrier partly broken away, and Fig. 3 being a vertical central section through the device.

Figure 4:
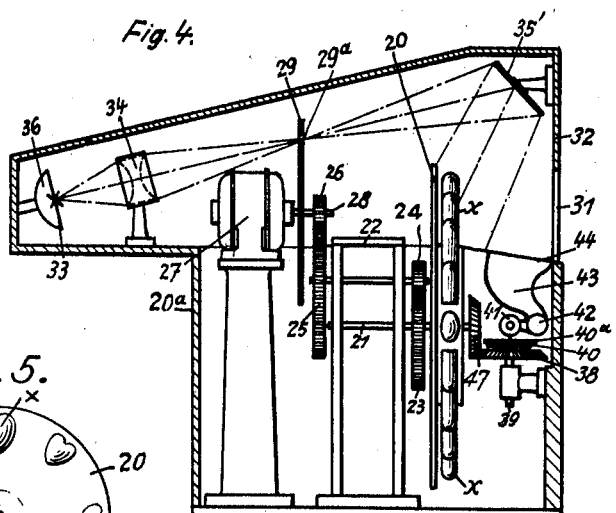
Figure 5:
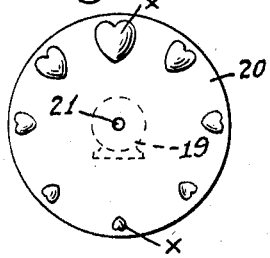

Fig. 4 shows another modification of a mechanical control for the collected rays of light by means of a quickly rotating perforated shutter, whereby the rays, after their transformation into evenly spaced short flashes of light are projected onto the last mentioned carrier. The figure is a side elevation with its casing partly broken away or in section; and Fig. 5 is a front elevation of the carrier showing a series of representations thereon in one exemplary form, such representations in other figures being represented by x.

In the diagram of Fig. 1, the reference numeral 1 denotes an auxiliary battery and 2 a rotary interrupter to which a condenser $2^a$ is connected in parallel. The numeral 3 denotes the primary coil of a transformer 4, to the secondary coil 5 of which the inertialess light relays 7 of suitable tension may be directly connected over an adjustable spark gap 6. Unless thus connected, the higher tension which previously has been required for the regulating spark would have to be reduced in a second transformer 8 to the tension which is required for said relay. The primary 9 of the transformer 8 is then connected to the spark gap 6, whereas the reduced control tension for the relays 7 is taken from the secondary 10.

To the terminals 11 and 12 of the line wires, an ordinary inert source of light 13, such for example as a self-adjusting arc lamp or a high candle power incandescent projector or a search light lamp is connected over a rheostat 14. The rays of light emanating from the lamp 13 are passed through a condenser 16, while the backwardly directed rays are preferably caught or collected by means of a reflector 15. If necessary, a cooling cuvette 18 may be introduced in front of the focal point 17 of the rays, while in said point, or close to it, the inertialess light relay 7 is arranged for the inertialess control of the lamp 13 in accordance with the number of rotations of the interrupter 2, so that an intermittent luminous field of short flashes of light and suitable frequency is produced. The divergent rays, after passing through the relay, are projected onto either the whole surface of the carrier 20 which is driven by the motor 19, or onto only a portion thereof. In the case of transparent designs, the light is projected directly, as shown in Fig. 1, while in the case of reflecting designs, mirrors and lenses are interpositioned as shown in Figs. 2 and 3.

In the arrangement of Figs. 2 and 3, the rays of light emanating from the inert source of light are mechanically converted or thrown into evenly spaced flashes of short duration by means of a quickly rotating mirror.

Regardless of the form of movable carrier employed, a definite relation is effected between the frequency of the light flashes and the speed of said carrier. Accordingly, the disc-shaped carrier of the illustrative embodiment is provided with transparent representations of successive stages of motion, such as described in the aforesaid application of which this is a division. Thus it will be clear that for each revolution of the carrier, as many of the light flashes will be required as there are individual representations on the carrier. For instance, if there are twenty representations or pictures on the carrier twenty light flashes will be required during every rotation of the carrier. This is advantageously accomplished by establishing the proper speed ratio between the drive of the shaft of the carrier and that of the rotating mirror. If the carrier is placed in a casing having an observation opening behind which the representations thereon are moved into view, it is obvious that the flashes of light must be made to take place consecutively with the appearance of said representations within said opening, so that at such moments the mirror must take the reflecting position of its cycle of movement.

In this instance, the disc-shaped carrier 20 contains transparent colored representations arranged equi-distantly in a cycle as represented by the small crosses in Fig. 2. The carrier disc is keyed on its shaft 21 which, together with other shafts of the device is journaled in the frame 22. For the sake of clear showing of other working parts, this machine frame is not shown in Fig. 2. The carrier shaft 21 is driven by the electric motor 27 through the train of speed gears 23, 24 and 25, 26. Owing to the scarcity of drawing space, the carrier itself is shown very small, but as indicated in Fig. 1, is actually much larger than the whole driving arrangement. A mirror 29 is provided on an arm on the motor shaft 28, which mirror is counterbalanced by a weight 30 on the opposite end of said arm. Every time a representation or picture appears in the center of the observation opening 31 in the casing's plate 32, said mirror will assume the position at which it reflects the rays of light emanating from the lamp 33 (Fig. 2), after these rays have converged in the condensing lens 34 to a focal point against the stationary mirror 35, whence they are projected onto the transparent picture 62 in the observation window just referred to. At the rear of the light source 33, a reflector 36 is provided to catch the backwardly directed rays, while between the rotary mirror 29 and the inclined stationary mirror 35, a collector lens 37 may be provided to prevent dispersion of the rays on their way to said stationary mirror so as to make the use of a small one possible.

Instead of having transparent pictures, the carrier may bear other kinds of representations, such for example as relief-like or plastic forms adapted to show under reflecting light. In such cases, it is necessary to provide a further inclined mirror 35' as shown in Fig. 4, by means of which the rays of light are projected upon said representations from the front.

The arrangement just described is intended to serve as an example only. The ways for the passage of the rays of light may of course be simplified and the number of mirrors reduced by other arrangements or dispositions of parts as circumstances may dictate.

Fig. 4 illustrates a modification of the device in which a "stop-shutter" (by which term is meant a suitably shaped member having a hole therein for the passage of the rays of light) is used for transforming the rays emanating from an ordinary constantly-shining source of light into evenly-spaced flashes of short duration. This figure further illustrates the arrangement of a mirror for conducting the flashes of light to the front of the carrier as aforestated, the representations of consecutive movements of an object thereon being in the form of colored plastic figures.

In cases where sound accompaniment for the moving representations is desired, the carrier may have an associated sound reproducing device of any suitable kind connected for synchronized operation. In Fig. 4, such a device is shown in the form of an ordinary gramophone connected with and driven by the carrier's shaft. Some other type of device, such for example as a magnetized steel wire (system Poulsen) may as readily be used. As is the case with the sound reproducing device itself, its manner of connection with the carrier or other part of the light advertising device is immaterial to the invention per se which, in this respect, resides more essentially in the arrangement of a sound reproducing device in connection with a device of the type described.

The said Fig. 4 merely illustrates a practical arrangement within a casing shown in sectional side elevation. According to this arrangement, the disc-shaped carrier 20 is provided with a cylindrical enlargement 20a upon which the colored, plastic representations $x$ of consecutive movement are arranged. The carrier is of course rotatable with its shaft 21 which is journaled in the frame 22 as before described. The shaft 21 of the disc is driven by the electric motor 27 through the reducing speed train of gears 23, 24 and 25, 26. On the motor shaft 28 there is arranged an opaque disc 29 formed with a hole 29a. Every time a representation appears in the center of the window opening 31 in the front wall 32, the hole 29a of the rapidly rotating disc or stop-shutter 29 is just in the focal point of the rays emanating from the constantly shining source of light 33 after such rays have passed through the condenser 34. Owing to the fact that the hole 29a in the shutter will present itself to the light only for an exceedingly brief moment and always at the same predetermined interval of time, the carrier with its individual representations will be illuminated at these predetermined intervals or moments by short flashes of light.

As the flashes of light are in this instance produced behind the carrier 20, they must be reflected against the front face thereof onto the particular representation which at the moment happens to be in the observation opening 31. This is done by means of a stationary inclined mirror 35'. Behind the source of light, the reflecting mirror 36 may be arranged for the utilization of the backwardly projected rays which otherwise would be lost.

A device of the type just described can be easily combined with a sound reproducing device. In the illustrative device, a bevel wheel 47 is fastened to the shaft 21 of the carrier, so as to engage with a bevel wheel 38. The shaft 39 of the latter carries the holder plate 40 for a gramophone record 40a. The sounds are taken from the latter by the sound box 41 and conducted through the arm 42 to the trumpet 43 from which they are emitted at the mouth opening 44. Complete synchronism between the optic and the acoustic performances assured because of the direct connection of the carrier with the sound reproducing device.

Various changes and deviations from the examples described may be resorted to without departing from the spirit of the invention. For instance, the carrier may be of different shape or configuration such as an endless band or drum, according to special conditions or requirements. Also the external shape of the devices may be made to suit particular purposes of advertising or places of exhibition.

What I claim is:

1. In a device for producing apparently moving display matter, a carrier having a plurality of representations of an object in different phases of movement arranged thereon in correspondence with such phases consecutively, means for driving the carrier to move said representations before the eye of an observer, a constantly shining source of light, and means collecting and converting the rays therefrom into short flashes of light occurring at the rate of one with each extent of the carrier's drive for the distance between adjacent representations so as to illuminate the same without perceptible shut-off of the light; said means embodying a light electric relay connected in an electric circuit including a source of current, a current interrupter, a condenser in parallel with the interrupter, a transformer, and an adjustable spark gap associated therewith.

2. In a device according to claim 1, the combination of sound reproducing means driven by the means driving the carrier for providing and synchronizing sound accompaniment with the illuminated display.

3. In a device for producing apparently moving display matter, means effecting instantaneous flash illumination of representations moved consecutively by a carrier to a point of momentary observation, comprising an inert course of constantly shining light, a light condenser for collecting and projecting the rays therefrom toward a point, a light-electric relay through which the rays are projected for timed control of the light flashes and a controlling electric circuit connected with the latter including a source of current, a current interrupter synchronized with the carrier for the representations, a condenser in parallel with the interrupter, and a transformer having a spark-gap associated with its secondary winding.

4. In a device for producing apparently moving display matter, means effecting instantaneous flash illumination of representations moved consecutively by a carrier to a point of momentary observation, comprising an inert source of constantly shining light, a light condenser for collecting and projecting the rays therefrom toward a point, a light-electric relay through which the rays are projected for timed control of the light flashes and a controlling electric circuit connected with the latter including a source of current, a current interrupter synchronized with the carrier for the representations, a condenser in parallel with the interrupter and a cooperative pair of transformers having a spark-gap between their secondary windings.

In testimony whereof I affix my signature.

AUGUST ABEL.